United States Patent [19]

Graton et al.

[11] Patent Number: 5,025,904
[45] Date of Patent: Jun. 25, 1991

[54] TORSION DAMPING DEVICE, IN PARTICULAR FOR A FRICTION CLUTCH FOR AN AUTOMOTIVE VEHICLE

[75] Inventors: Michel Graton, Paris; André Dalbiez, Argenteuil, both of France

[73] Assignee: Valeo, Paris, France

[21] Appl. No.: 500,459

[22] Filed: Mar. 28, 1990

[30] Foreign Application Priority Data

Mar. 31, 1989 [FR] France .................. 89 04228

[51] Int. Cl.⁵ .................................. F16D 3/14
[52] U.S. Cl. ...................... 192/106.2; 192/106.1; 192/104 C; 464/66
[58] Field of Search .............. 464/66, 68; 192/65, 192/30 V, 70.17, 104 C, 105 BA, 105 CF, 106.1, 106.2

[56] References Cited

U.S. PATENT DOCUMENTS

| | | | |
|---|---|---|---|
| 3,675,750 | 7/1972 | Wright | 192/105 BA |
| 4,376,477 | 3/1983 | Loizeau | 192/106.2 |
| 4,412,606 | 11/1983 | Loizeau | 192/106.2 |
| 4,474,277 | 10/1984 | Loizeau | 192/106.2 |
| 4,634,398 | 1/1987 | Alas | 192/106.2 |
| 4,635,780 | 1/1987 | Wiggen | 192/106.2 |
| 4,669,592 | 6/1987 | Alas et al. | 192/106.1 |
| 4,679,679 | 7/1987 | Lech, Jr. et al. | 192/106.1 |
| 4,698,045 | 10/1987 | Billet et al. | 192/106.2 |
| 4,739,866 | 4/1988 | Reik et al. | 192/106.2 |
| 4,763,767 | 8/1988 | Lanzarini et al. | 192/106.2 |

FOREIGN PATENT DOCUMENTS

| | | |
|---|---|---|
| 209314 | 1/1987 | European Pat. Off. . |
| 3627784 | 7/1987 | Fed. Rep. of Germany ... 192/104 C |
| 3810922 | 10/1988 | Fed. Rep. of Germany . |
| 2495255 | 6/1982 | France . |
| 2560328 | 8/1985 | France . |
| 2566497 | 12/1985 | France . |
| 2611245 | 8/1988 | France . |
| 155633 | 9/1984 | Japan ........................ 192/104 C |
| 2169989 | 7/1986 | United Kingdom . |

Primary Examiner—Rodney H. Bonck
Assistant Examiner—Nicholas Whitelaw
Attorney, Agent, or Firm—Charles E. Brown; Charles A. Brown

[57] ABSTRACT

This invention is concerned with a torsion damping device for an automotive vehicle, of the kind comprising two coaxial parts and an intervention member for modifying the operating characteristics of the damping device. One of the two coaxial parts includes a hub, and the intervention member comprises at least one plate, resiliently deformable in the radial direction and with the hub extending through it. The intervention plate has, at its inner periphery, an inner surface which is adapted to come into engagement on an abutment surface which is fixed with respect to the outer periphery of the hub. The plate is fixed axially in at least two points to one of the said coaxial parts of the torsion damper that is not rotatable with the hub. It is moveable radially between the said abutment surface of the hub and at least one end stop abutment forming part of one of the coaxial parts of the device.

10 Claims, 5 Drawing Sheets

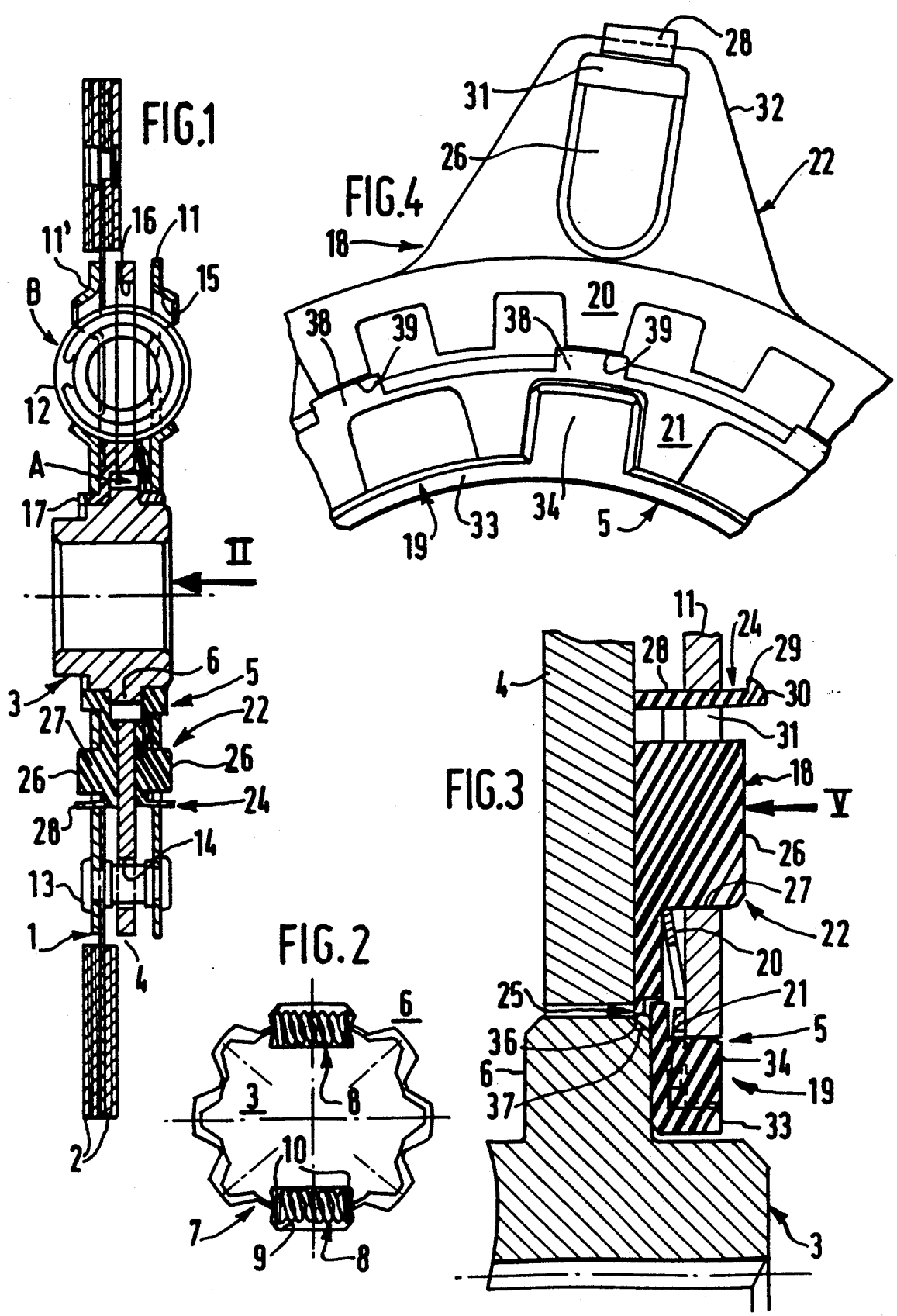

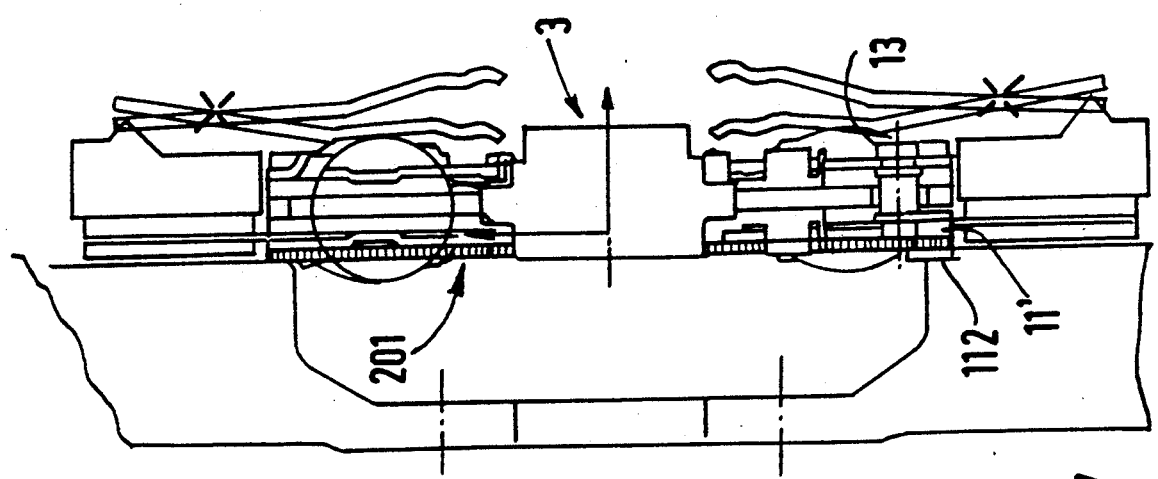
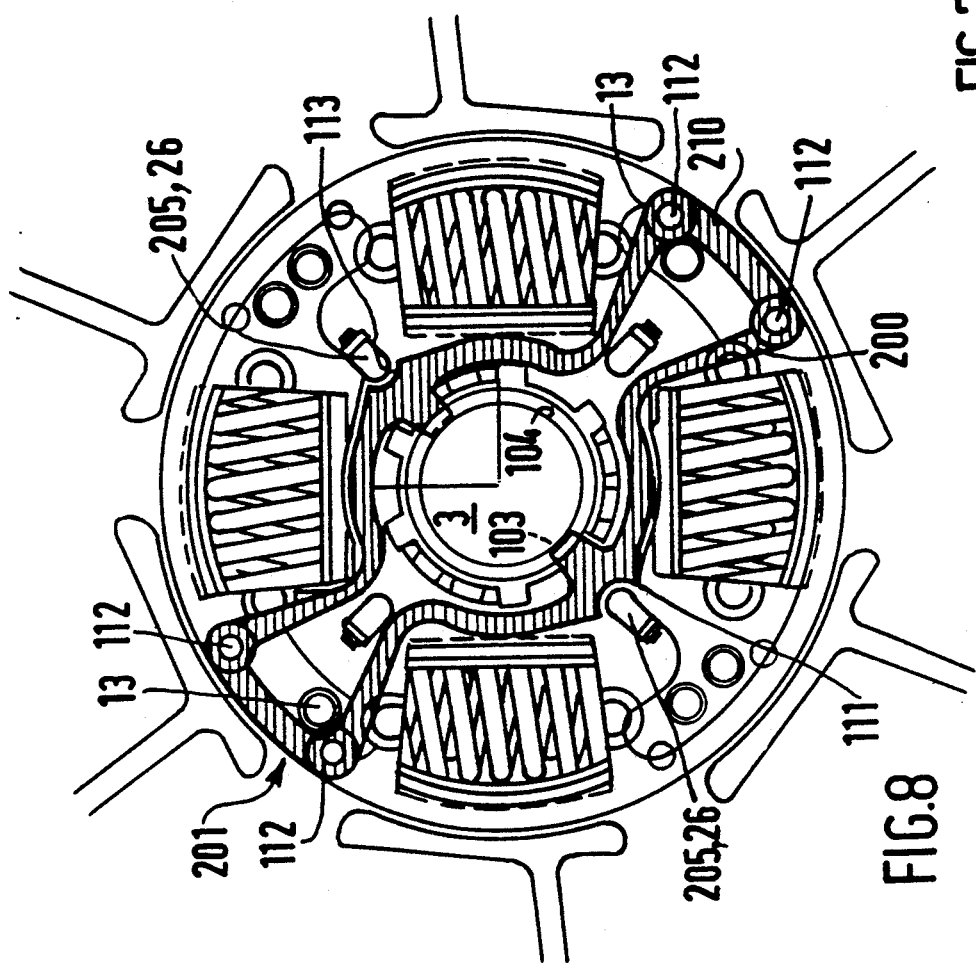

TORSION DAMPING DEVICE, IN PARTICULAR FOR A FRICTION CLUTCH FOR AN AUTOMOTIVE VEHICLE

FIELD OF THE INVENTION

This invention relates to torsion damping devices, in particular for incorporation in friction clutches, the damping device being of the kind comprising at least two coaxial parts which are mounted for rotation with respect to each other within the limits of a predetermined angular or circumferential displacement and against the action of resilient members adapted to act circumferentially between them over at least a range of the said circumferential displacement, the damping device also including an intervention member for modifying the operating characteristic of the damping device over at least part of the said range of displacement, the intervention member being responsive to the centrifugal force against the action of return means so as to be movable reversibly between a rest position corresponding to relatively low speeds of rotation of the assembly and a service position corresponding to higher speeds, in such a way that it affects the said operating characteristics in the rest position but not in the service position.

BACKGROUND OF THE INVENTION

A device of the kind defined above is described in U.S. Pat. No. 4,433,770 and the corresponding French published patent application FR No. 2 495 255A, in which the intervention member is mounted for rotation and is adapted to come into engagement on the outer periphery of the hub. The latter is part of one of the said coaxial parts of the device, and includes a fixed abutment means for engagement by the intervention member.

A return spring is attached to the latter. These arrangements enable resilient members of lower stiffness, forming part of the torsion damping device, to be restrained from acting by themselves, so that these resilient members can be inoperative when not required.

The intervention member enables shocks that occur when the speed of rotation is lower than the slow running speed of the engine, for example when declutching followed by clutching causes stalling of the engine, to be eliminated. However, these arrangements call for a large number of components, mainly because of the rotatable mounting of the intervention member. They are also bulky.

SUMMARY OF THE INVENTION

An object of the present invention is to reduce these disadvantages and to provide a torsion damping device which is economical and less bulky, having an intervention member which is operative in its rest position; and to produce other advantages.

In accordance with the invention, a torsion damping device of the kind defined above is characterised in that the intervention member comprises at least one plate, resiliently deformable in the radial direction and with the hub extending centrally through it, the plate having on its inner periphery an inner surface, which is adapted to come into engagement on an abutment means that is fixed with respect to the outer periphery of the hub, the said hub being fixed axially in at least two points to that one of the said coaxial parts of the damping device which is not rotatable with the hub, the plate further being capable of radial movement between the said abutment means of the hub and at least one end stop abutment which is part of one of the said coaxial parts.

The invention enables the intervention member to be manufactured economically from metal sheet stock without being mounted rotatably and without much modification of the damper.

Preferably, it is given its elasticity by cutting out the said metal sheet stock, and it incorporates its own resilient return means, at least one of its portions being heavier than the remainder. In line with these heavier portions, protections are formed which are adapted to grip the hub like the jaws of a vice.

The projections preferably extend radially across the bearing which is inserted radially between one of the guide rings and the hub, and which a torsion damper conventionally includes.

Preferably, one of the components of a standard torsion damper is used for securing the intervention member, these components for example comprising the spacers which join together the guide rings conventionally form part of a torsion damping device.

In order to limit its radial outward displacement, advantages is taken of the existence of boses on the friction rings which extend into openings formed in the guide rings. Alternatively, advantage may equally be taken of the spacers themselves to the same end. It is also of course possible to add further bosses.

The description which follows illustrates the invention, by way of example only, with reference to the accompanying drawings.

BRIEF DESCRIPTION OF THE DRAWINGS

FIG. 1 is a view in axial cross section of a torsion damping device, which is also equipped with an intervention member in accordance with the invention.

FIG. 2 is a simplified view of the loose coupling means provided between the damper plate and the hub of the said torsion damping device.

FIG. 3 is a partial view, on a larger scale, showing first and second friction means of the torsion damping device shown in FIG. 1.

FIG. 4 is a view of the same friction means by themselves, as seen in the direction of the arrow V in FIG. 3.

FIGS. 7 and 8 are views similar to FIGS. 5 and 6 respectively, showing another embodiment.

DESCRIPTION OF PREFERRED EMBODIMENTS OF THE INVENTION

Figure 5:
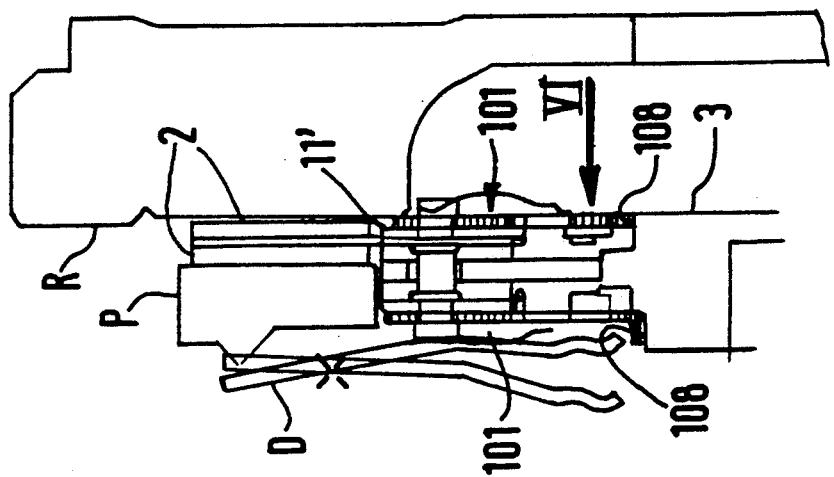
FIG. 5 is a diagrammatic half view, seen in axial cross section and showing the torsion damping device equipped with intervention members in accordance with the invention and mounted as part of a clutch.

In the embodiments of the invention shown in the drawings, the torsion damping device is an integral part of a friction clutch for an automative vehicle.

This clutch is shown in FIG. 1, and comprises a support member 1 for friction pads 2, and a hub 3, which are moveable in a rotational sense with respect to each other within the limits of a predetermined angular or circumferential displacement. The support member 1 and hub 3 are coupled together through two torsion damping devices which act one after the other, and consist of a predamper A and a main damper B, the former being weaker than the latter. The support member 1, which is in the form of a disc, is adapted to be gripped, through its friction pads 2, between the pressure plate P and the reaction plate R (FIG. 5) of the clutch, which are mounted for rotation with the engine output shaft of the vehicle; while, through its hub 3 the support 1 is arranged to be carried on the input shaft of the gearbox for rotation with it.

The predamper A comprises a damper plate 4 which is mounted for limited rotational movement with respect to the hub 3, against the action of a friction means 5 and within the limits of a predetermined angular displacement. In this example, the hub 3 has a flange 6 projecting radially from its outer periphery in line, axially, with the inner periphery of the damper plate 4.

A loose coupling means 7, of the kind described in French published patent application No. FR 2 560 328A, are formed partly on the inner periphery of the damper plate 4 and partly in the flange 6. These loose coupling means comprise a plurality of trapezoidal teeth and a plurality of complementary recesses, with each tooth of the hub 3 or damper plate 4 engaging, with a circumferential clearance, in a corresponding one of the recesses formed in the damper plate or the hub respectively. Resilient means (referred to in this Application as "second resilient means") 8, having a relatively low stiffness and acting circumferentially, are provided for the purpose of damping out deceleration noise or shocks. The second resilient means 8, which are associated with the loose coupling 7, consist in this example of two diametrically opposed coil springs which are mounted in slots 9 formed in the damper plate 4 and hub 3. Thrust inserts 10 are fitted between the ends of the springs 8 and the associated end surfaces of the slots 9, and are a dihedral or cranked shape.

The main damper B comprises a pair of guide rings 11 and 11', which are mounted for rotational movement, within the limits of a predetermined angular displacement, with respect to the damper plate 4 against the action of circumferentially acting resilient means 12. The latter are referred to herein as "first resilient means", and in this example they consist of coil springs having a greater stiffness than the springs 8.

The guide rings 11 and 11' are arranged axially on either side of the damper plate 4, and are connected together at a fixed axial spacing by means of axial spacers 13, which also serve to secure the support member 1 to the guide ring 11'. The spacers 13 extend through apertures 14 formed through the damper plate 4, with a clearance around the spacers. The limitation on the relative angular displacement between the damper plate 4 and the guide rings 11 and 11' can be achieved by the cooperation of the spacers 13 with the edges of the apertures 14 when the turns of the springs 12 are compressed against each other. The springs 12 are mounted in windows 15 and 16 which are formed in the guide rings 11, 11' and in the damper plate 4 respectively, the windows in each member being arranged facing those in the other members.

The guide rings 11 and 11' freely surround the hub 3, without any loose coupling means, by contrast with the damper plate 4 which surrounds the hub 3 and which has the loose coupling means 7 intervening between it and the hub.

An annular bearing 17, of generally L-shaped cross section, is interposed between the support disc 1 and guide ring 11' on the one hand and the damper plate 4 on the other, extending radially so as to act as an axial spacing ring between them. This bearing is also inserted radially between the inner periphery of the guide ring 11' and the outer periphery of the hub 3. It is coupled for rotation with the guide ring 11', with its annular axial portion having projections engaged in complementary recesses in the guide ring 11'.

Between the other guide ring 11 and the damper plate 4, there are interposed friction rings 18 and 19, together with associated axially acting resilient means, which in this example comprise two tabbed Belleville rings 20 and 21; these ensure the necessary frictional contact. The ring 20 bears on the guide ring 11 and biases the friction ring 18 towards the damper plate 4, so that the bearing 17 is gripped between the support member 1 and the damper plate 4. The ring 21 bears on the guide ring 11 and biasses the friction ring 19 towards the flange 6, so that the bearing 17 is also gripped between the guide ring 11'and the flange 6.

The friction clutch in this example can thus be seen to have three coaxial parts, namely one part comprising the guide rings 11 and 11', a second part comprising the damper plate 4, and finally a third part comprising the hub 3.

The guide rings are, in this way, moveable against the first circumferentially acting resilient means 12 and against the action of first friction means 22, which comprise the rings 18 and 20 together with the bearing 17.

Similarly, the hub 3 is moveable circumferentially with respect to the damper plate 4, against the action of second circumferentially acting resilient means 8 and of the friction means 5 (or second friction means), which comprise the rings 19 and 21 together with the bearing 17; the two friction means 22 and 5 are disposed radially one outside the other, with the rings 18 and 20 surrounding the rings 19 and 21.

Abutment means 24 are provided between the friction ring 18 and the guide ring 11 , while axial retaining means 25 are provided between the two friction rings 18 and 19. The friction rings 18 and 19 and the bearing 17 are all preferably made of a synthetic material.

The friction ring 18 has a set of integral projections in the form of bosses 26, which project axially and which are spaced apart circumferentially at regular intervals. Each boss 26 extends through a cylindrical hole 27 formed in the guide ring 11, so that the friction ring 18 is coupled with the latter for rotation with it. The radially outer part of the bosses 26 is interrupted so as to form fingers 28, which are deformable resiliently in the radial direction and which are narrower than the bosses 26. They are also longer than the pins 26, the radial width of which is of course smaller than that of holes 27. The free end of each finger 28 has a hook 29 which is directed radially away from the axis of the assembly. This hook has a rounded end 30. Each boss 26 is oblong in shape, having two straight edges joined by a rounded, semi-cylindrical base portion which constitutes the radially inner part of the boss so that its shape is here complementary to that of the corresponding hole 27. Each finger 28 and its associated boss 26 project from an ear 32, FIG. 4, of the friction ring 18. Each ear 32 is formed with an opening 31 which allows the fingers 28 to flex. This arrangement comprising the bosses 26, holes 27 and fingers 28, constitutes the above mentioned abutment means 24.

The friction ring 19 has on its inner periphery an axial flange portion 33 which is provided at intervals with bosses 34, each of which cooperates with a corresponding notch formed in the guide ring 11, so as to couple the latter with the friction ring 19 for rotation together.

The above mentioned axial retaining means 25 comprise a radial shoulder 36 which is formed on the inner periphery of the friction ring 18, for cooperation with a surface 37 on the outer periphery of the friction ring 19. The shoulder 36 encloses grooves 38, while the surface 37 is formed on projections 39 which extend into the grooves 38.

It is thus possible to create a unitary sub-assembly comprising the various rings 11, 19, 18, 20 and 21.

The guide rings 11 and 11' are identical with each other, and the bearing 17 is also provided with bosses 26 and fingers 28 for engagement in the holes 27 of the guide ring 11'.

It will be recalled that, when the support member 1 is displaced circumferentially with respect to the hub 3, the guide rings 11 and 11' are at first solid with the damper plate 4, because of the stiffness of the springs 12 as compared to that of the springs 8, whit the damper plate 4 being displaced with respect to the hub 3 against the action of the springs 8 until the circumferential clearance in the loose coupling means 7 has been taken up. In a second stage of the movement, the springs 8 are then inoperative, and the guide rings 11 and 11' are displaced circumferentially with respect to the damper plate 4, against the action of the springs 12. Thus in the initial stage, the friction ring 19 is operational, while the friction ring 18 only acts subsequently.

The friction clutch also includes at least one intervention member 100, which modifies the operating characteristics of the damping device over at least part of the range of circumferential movement between the support member 1 and the hub 3. To this end, the member 100 is responsive to centrifugal force against the action of a return means, and is moveable in a reversible manner between a rest position and a service position. The rest position corresponds to relatively low values of speed of rotation of the assembly, while the service position corresponds to higher values. In the rest position, the intervention member 100 modifies the operating characteristics of the damping device, whereas it does not do so in the service position.

In accordance with the invention, the intervention member 100 comprises at least one plate 101, which is deformable resiliently in the radial direction and through which the hub 3 extends. The member 100 has at its inner periphery a surface 103 which is adapted to come into engagement with an abutment surface 104 formed on the outer periphery of the hub 3. The plate 101 is secured axially in at least two points to that one of the above mentioned coaxial parts of the damping device which is not rotatable with the hub 3, and is radially moveable between the abutment surface 104 of the hub and at least one end stop abutment 105 which is part of one of the above mentioned coaxial parts of the damper.

Figure 6:
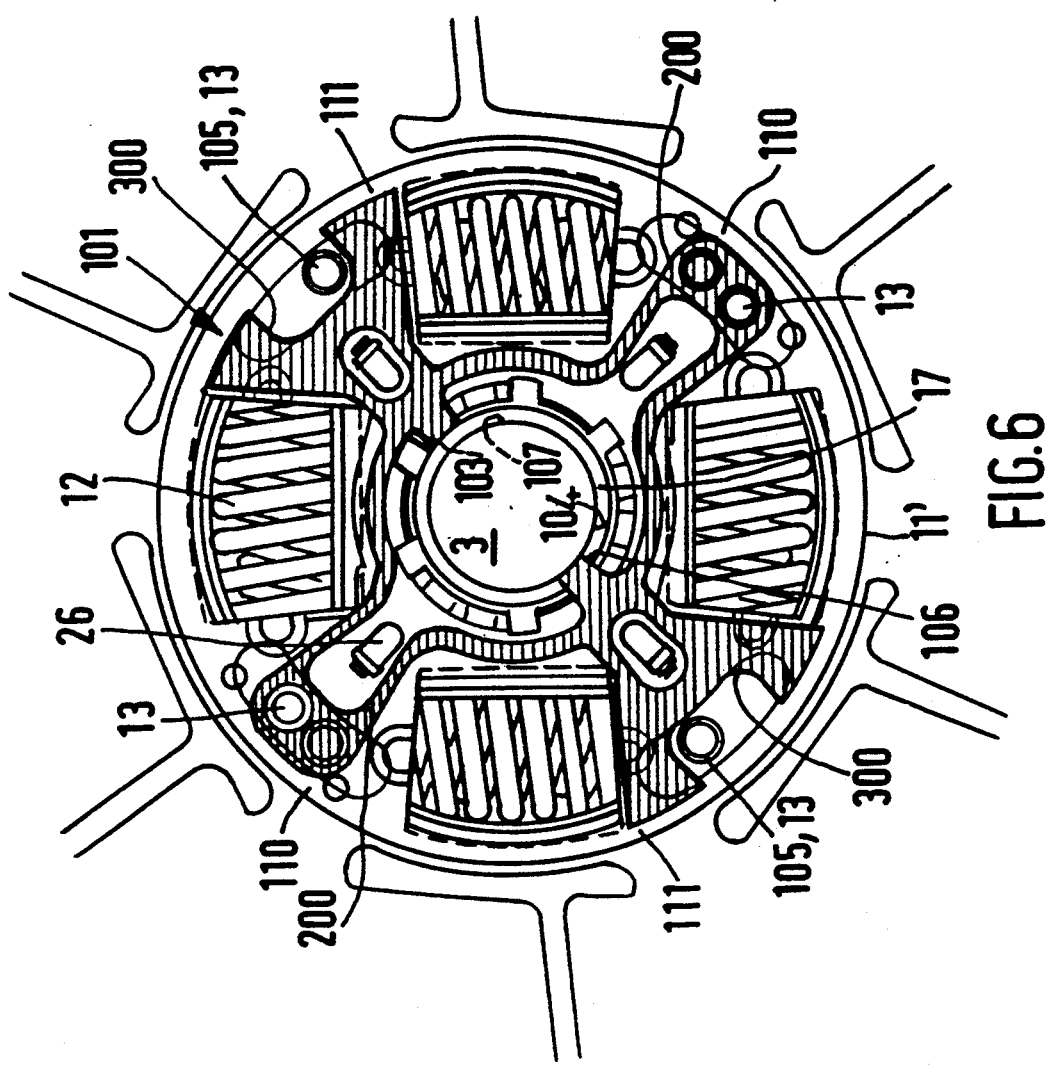
FIG. 6 is a partial view seen in the direction of the arrow VI in FIG. 5.

In the first embodiment of the invention shown in FIGS. 5 and 6, it will be seen that there are in fact two plates 101, which are arranged outside the region defined by the guide rings 11, 11', each of the plates 101 being associated with a respective one of the guide rings 11, 11' and being coupled to it. The plate 101 in FIG. 6 is fixed axially to the guide ring 11' by means of two of the spacers 13 diametrically opposed to each other. Its inner surface 103 is formed on two diametrically opposed radial projections 106, each of which passes through an opening 107. The latter is formed in the axial portion of the bearing 17, so that the projections co-operate frictionally with an axial surface 108 formed on the outer periphery of the hub 3. This arrangement also ensures centring of the bearing 17. The hub surface 108 constitutes, in this example, the abutment surface 104 of the hub.

The plate 101 extends around the bearing 17 through its outer periphery, with the hub 3 and bearing 17 extending through it. The plate 101 is perforated in the region of the bosses 26 of the friction ring 18, so as to avoid any contact with the bosses 26, and has two diametrically opposed, apertured arms 110, each of which encloses a respective one of the bosses 26 and each of which is secured by means of the appropriate spacer 13. The arms 110 define the outer periphery of the plate 101, and are joined together through the annular central portions which carry the projections 106. The plate 101 also includes two weight portions 111, which are offset circumferentially from the arms 110 by 90 degrees. Each weight portion 111 has a through hole, to accommodate a respective one of the bosses 26 with a clearance around the latter; and also has at its outer periphery a respective U-shaped slot 300, into which extend the heads of the other two spacers 13. It is these two spacers which constitute the end stop abutments 105 which co-operate, in particular, with the bases of the respective slots 300.

The arms 110 accordingly define strips 200 of material which connect the two weight portions 111 together. It is these strips 200 which confer flexibility on the plate 101 by constituting resilient return means for the weight portions 111. The arms 110 penetrate radially between two successive ones of the springs 12, and are secured to the outer periphery of the friction clutch. The weight portions 111 are associated with the projections 106.

In operation, so long as the engine speed of the vehicle is below its slow running mode, the projections 106 are in contact with the surface 108, and the weight portions 111 are out of contact with the two associated spacers 13. The hub 3 is frictionally coupled with the guide rings 11 and 11', in such a way that no movement occurs in the loose coupling means 7. Any shocks or noises caused by impact of the toothed portions are thus eliminated.

At speeds in the vicinity of the slow running mode, the weight portions 111 make their effect felt, and the projections 106 move outwardly under the action of centrifugal force, so that the hub 3 is then free for appropriate relative rotational movement, described earlier herein, to take place.

The other plate 101, i.e. that which is associated with the guide ring 11, is identical to the plate described above, except in connection with the projections 106, which have an axially projecting portion (see FIG. 5) in contact with the outer periphery of the hub 3 in order to improve the stability of the plate.

In order to diminish the radial forces within the friction clutch, the plates 101 are offset from each other by 90 degrees. With reference to FIG. 5, it can be seen that the arrangement in accordance with the invention in no way prevents the diaphragm D of the clutch from deforming as required in normal operation. It can also be seen that it occupies little axial space.

In the embodiment shown in FIGS. 7 and 8, the two diametrically opposed arms, 210, are each fixed to the guide ring 11' by means of two dedicated fastening rivets 112, while the end stop abutment, 205, comprises the inner edge of the bosses 26, with the plate 201 having rounded slots 113 the shape of which is complementary to the inner edge of the bosses 26. As before, the arms 210 are perforated, not only to allow the bosses 26 to extend through them, but also to accommodate the spacers 13 with a clearance around them. The rivets 112 extend beyond the spacers 13, so that the arms 210 are elongated.

It is of course possible to cut the plate 101 in two. Its two portions are then joined together in the region of their arms 110, each using one fastening rivet 112.

Figure 9:
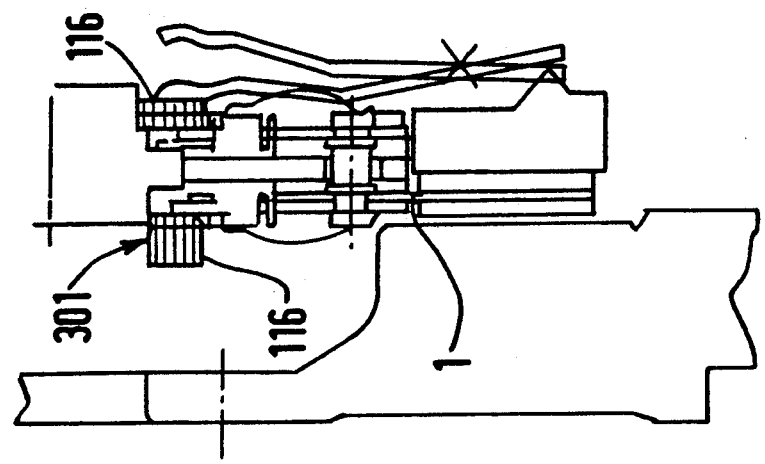
FIG. 9 and 10 are views similar to FIGS. 5 and 6 respectively, but showing a further embodiment.
Figure 10:
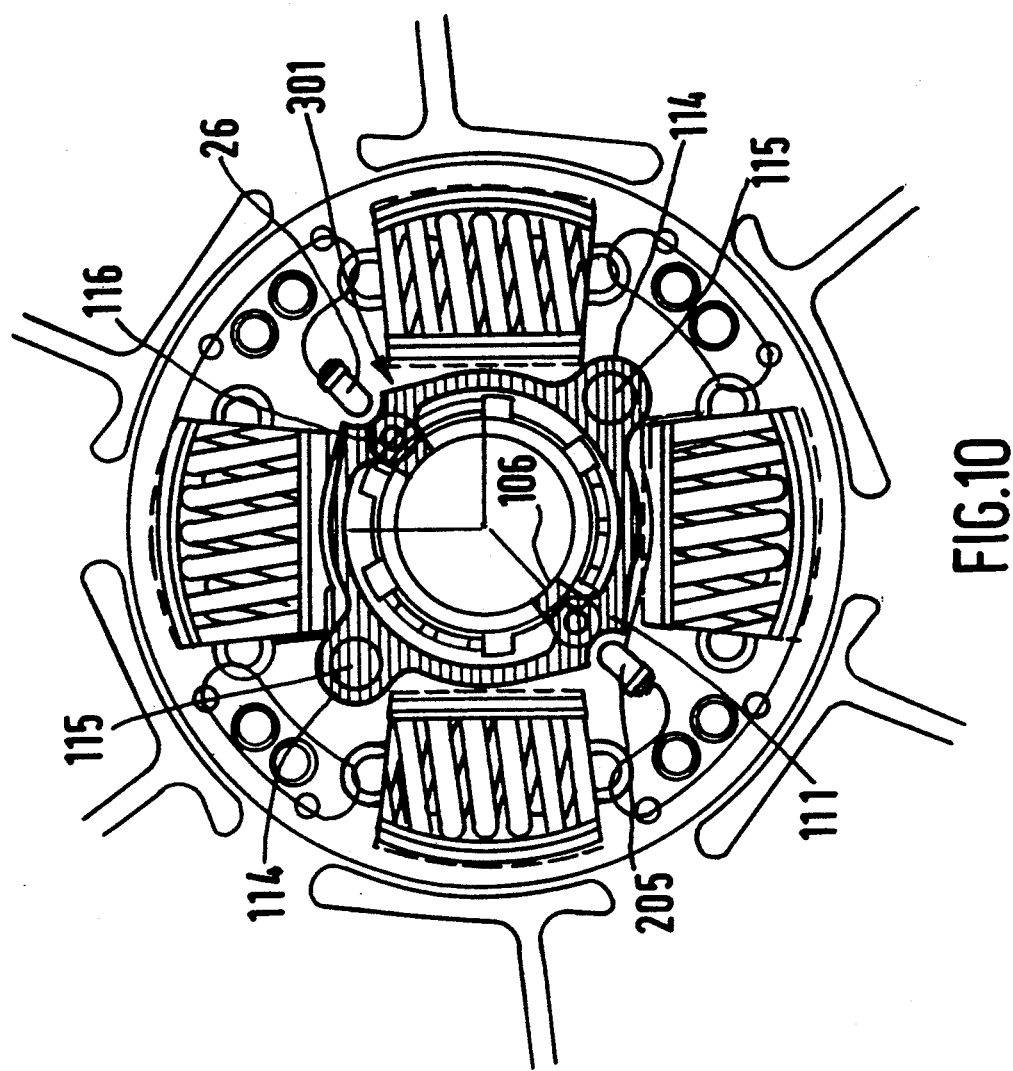

In the embodiment shown in FIGS. 9 and 10, the end stop abutments 205 are still constituted by the bosses 26, but the intervention plate, 301, has two fixing ears 114 in the region of the inner edge of the windows 15, and it is fixed to the guide ring 11' by means of dedicated rivets 115. Supplementary weights 116 are secured on the plate 301 in the region of the bosses 26.

Figure 11:
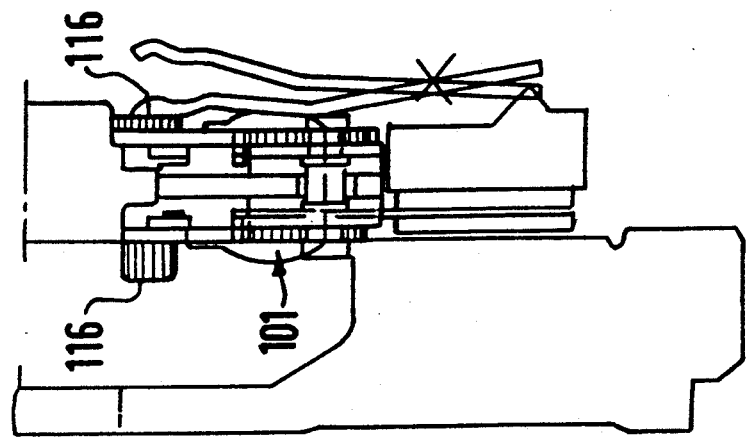
FIGS. 11 and 12 are views similar to FIGS. 5 and 6 respectively, but showing yet another embodiment.
Figure 12:
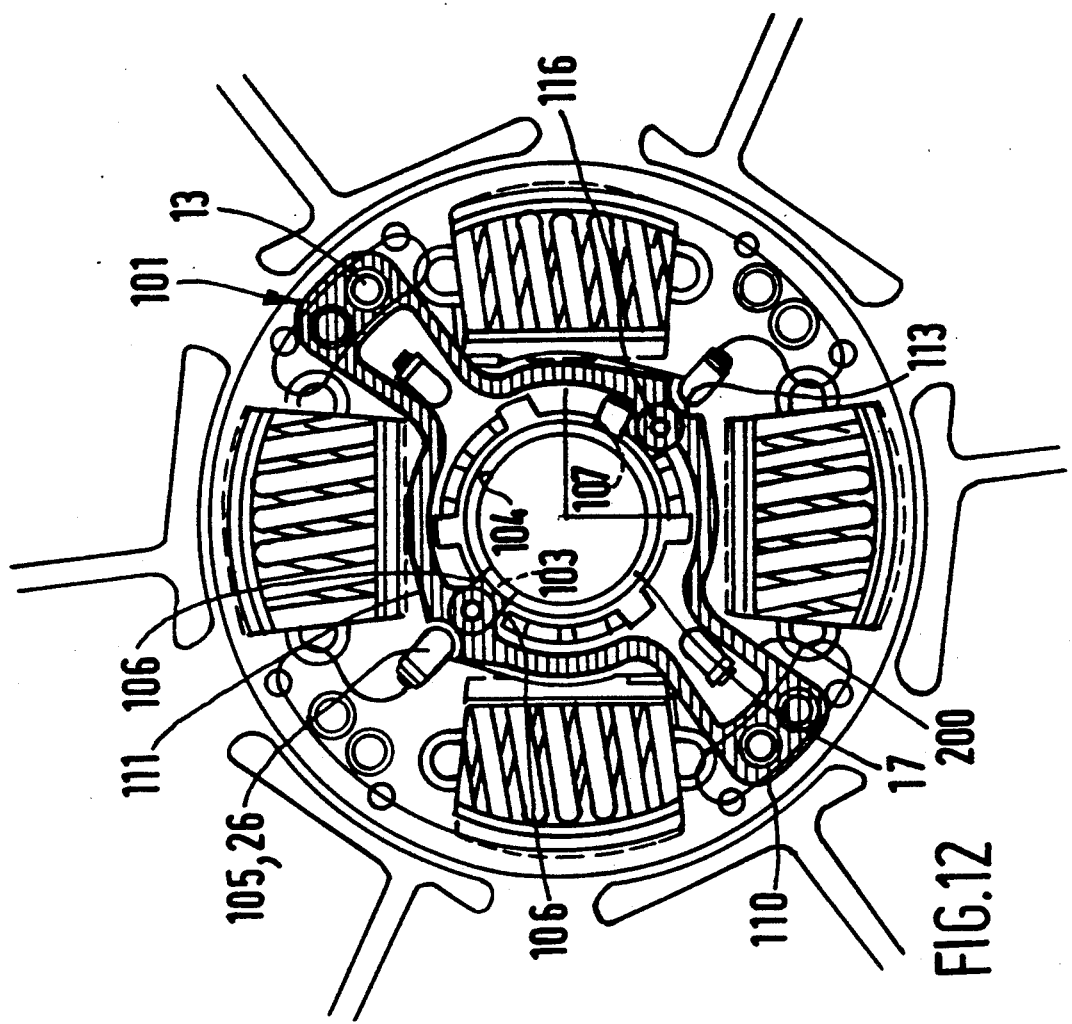

In the further embodiment seen in FIGS. 11 and 12, the weights 116 remain, but the plate is secured on two of the spacers 13 in the same way as the plate 101 in FIG. 1.

The present invention is of course not limited to the particular embodiments described above. In particular, the end stop abutment may consist of rivets provided for this purpose. For example, in FIG. 6 the slots 300 may be hollowed out further, with pins, bosses or dedicated rivets being provided so as to cooperate with these slots.

The low stiffness resilient means 8 may form part of a predamper with guide rings and damper plate disposed axially between the damper plate 4 and one of the guide rings 11 or 11', in the manner described in French published patent application No. FR 2 611 245A and in published patent application No. DE 3 310 922A of the Federal Republic of Germany.

The damper plate 4 may be split in the manner described in French published patent application No. FR 2 566 497A.

The hub 3 may be secured to the damper plate 4 by gripping, for example, and in this case the springs 8 no longer form part of a predamper but are mounted in the windows 15 and 16, in which they may be fitted without clearance; and the other springs, i.e. those of greater stiffness, are mounted without clearance in the windows 15 of the guide rings 11' and with clearance in the windows 16 of the damper plate 4, so as to provide differential action of the springs. In that case, the friction clutch has only two coaxial parts.

As described above, the plates 101, through their cooperation with the hub 3, modify the characteristics of the damping device by preventing the springs 8 from acting by themselves.

The damper plate 4 may be mounted freely with respect to the hub 3, and may carry the support member 1. In this case the guide rings are secured with respect to the hub 3, and the plates 101 may be secured by means of rivets which are fixed to the damper plate 4.

The end stop abutments 205 may in all cases be defined by the bosses 26.

There may of course only be one intervention plate 101. The shape of the weights 116 (FIGS. 9 and 11) may be changed. Finally, the abutment surface 104 and/or the inner surface 103 formed on the projections 106 may be provided with a coating. In a further modification, teeth may be provided for cooperation of the surface 103 with the abutment surface 104.

What is claimed is:

1. A torsion damping device for a friction clutch, comprising a plurality of coaxial parts;
    means mounting the said parts coaxially with each other and defining a range of angular displacement with which the said coaxial parts are rotatable relative to each other; and
    resilient means coupling the said coaxial parts whereby at least part of the said angular displacement takes place against circumferential action of the said resilient means, one of the said coaxial parts comprising a hub defining an abutment surface on an outer periphery thereof, and one of the said coaxial parts having end stop means facing generally inwardly in a radial direction,
    wherein the damping device further comprises at least one intervention plate, radially deformable resiliently and surrounding the hub; return means for biassing the intervention plate against resilient deformation out of a relaxed state thereof; and
    means securing said plate axially in at least two points to a said coaxial part other than that comprising the hub, said plate having an inner peripheral surface and an end stop engaging surface radially inward of said end stop means,
    whereby in a rest position of said plate, at relatively low speeds of rotation, the plate is in its relaxed state and grips the hub through its inner peripheral surface and the abutment surface of the hub, while at higher speeds it is deformed radially under centrifugal force so as to release its grip on the hub, its radial deformation being limited by the end stop means in a service position of the plate, so that the plate modifies operating characteristics of the damping device over at least part of the said range of angular displacement when in its rest position but not in its service position.

2. A torsion damping device according to claim 1, wherein one of the said coaxial parts comprises two guide rings and spacers connecting the two said guide rings together at an axial fixed spacing, at least two said spacers securing the said plate axially to the guide rings.

3. A torsion damping device according to claim 1, wherein the said plate has at least one projection, the said inner peripheral surface of the plate being formed on the said at least one projection.

4. A torsion damping device according to claim 3, further comprising a bearing radially interposed between one of the guide rings and the hub, the bearing having at least one opening therethrough, with the said projection, or each projection, extending through a correspoding said opening for cooperation with the said abutment surface on the outer periphery of the hub.

5. A torsion damping device according to claim 3, wherein the said plate comprises at least one weight responsive to centrifugal force.

6. A torsion damping device according to claim 5, wherein the weight is associated with the said at least one projection of the plate.

7. A torsion damping device according to claim 6, wherein the plate includes two weight portions constituting the said weights, and arms joining the weight portions together and constituting the return means, the arms being fixed axially to one of the guide rings and each being located between two successive ones of the said circumferentially acting resilient means.

8. A torsion damping device according to claim 7, wherein the arms of the plate comprise thin strips of material.

9. A torsion damping device according to claim 1, wherein one of the said coaxial parts includes two guide rings and spacers joining the guide rings together at an axial spacing, the end stop means comprising at least one of the said spacers.

10. A torsion damping device according to claim 1, wherein one of the said coaxial parts includes guide rings, and another comprises a damper plate, the guide rings being arranged axially on either side of the damper plate, the device further comprising friction rings arranged to act between the damper plate and the guide rings and having bosses extending through each guide ring, the said end stop means comprising at least one of the said bosses.

* * * * *